United States Patent [19]

Umezu et al.

[11] Patent Number: 4,840,220
[45] Date of Patent: Jun. 20, 1989

[54] HEAT PUMP WITH ELECTRICALLY HEATED HEAT ACCUMULATOR

[75] Inventors: Kenji Umezu, Shizuoka; Tetsuo Sano, Fujinomiya, both of Japan

[73] Assignee: Kabushiki Kaisha Toshiba, Kawasaki, Japan

[21] Appl. No.: 109,310

[22] Filed: Oct. 19, 1987

[30] Foreign Application Priority Data

Oct. 23, 1986 [JP] Japan .................... 61-252290

[51] Int. Cl.$^4$ .............................. F25B 29/00
[52] U.S. Cl. .................... 165/1; 165/12; 165/18; 165/21; 165/29; 165/10; 237/2 B; 237/75; 236/46 R; 219/530
[58] Field of Search .............. 165/29, 18, 12, 1, 21, 165/17; 237/2 B, 75; 236/46 R

[56] References Cited

U.S. PATENT DOCUMENTS

| | | | |
|---|---|---|---|
| 2,677,243 | 5/1954 | Telkes | 165/18 |
| 2,723,083 | 11/1955 | Bary | 165/29 |
| 4,265,298 | 5/1981 | Sumner, Jr. et al. | 165/29 |
| 4,436,064 | 3/1984 | Lamkowitz et al. | 236/46 R |
| 4,590,771 | 5/1986 | Shaffer et al. | 62/156 |
| 4,645,908 | 2/1987 | Jones | 165/29 |
| 4,660,759 | 4/1987 | Barnard et al. | 236/46 R |
| 4,706,882 | 11/1987 | Barnard | 236/46 R |

FOREIGN PATENT DOCUMENTS 60-114648 6/1985 Japan.

*Primary Examiner*—Albert W. Davis, Jr.
*Assistant Examiner*—John K. Ford
*Attorney, Agent, or Firm*—Cushman, Darby & Cushman

[57] ABSTRACT

A temperature setting unit is operated to set a desired temperature. An indoor temperature detector detects an indoor temperature. A timer is operated to set an operation start time. An indoor unit includes at least an indoor heat exchanger, an air duct associated with the indoor heat exchanger, a heat radiation member located in the air duct, a heat accumulator thermally coupled to the heat radiation member, and an electric heater for selectively supplying heat to the heat accumulator. An outdoor unit includes at least a compressor for cooperating with the indoor heat exchanger to constitute a heat pump refrigeration cycle for heating operation, and an outdoor exchanger. A controller outputs a first control signal for preheating the electric heater a predetermined period of time before operation start time by counting preset data of the operation start time from the timer, and a second control signal for setting the heat pump refrigeration cycle in a drive state at the operation start time. The controller controls the drive state on the basis of desired temperature data set by the temperature setting unit and indoor temperature data detected by the indoor temperature detector, thereby maintaining an indoor temperature at the desired temperature.

11 Claims, 4 Drawing Sheets

HEAT PUMP WITH ELECTRICALLY HEATED HEAT ACCUMULATOR

BACKGROUND OF THE INVENTION

This invention relates to an air conditioner system with a heating operation assist function and, more particularly, to an air conditioner system of a heat pump type capable of performing a heating operation.

In a conventional air conditioner system, a heat pump type refrigeration cycle is used to perform both cooling and heating operations.

In the heating operation in an air conditioner system of this type, the following items must be taken into consideration to provide comfort to a user in an air-conditioned room.

First, the initial operation of the heating operation must be improved. The heating capacity of an air conditioner system of this type only operates correctly after the heat pump type refrigeration cycle is stabilized due to the following reason. When air is blown before the stable state is set, air which is not sufficiently heated is supplied to the user, and the user may feel cold, because heated air is blowing.

Second, a defrosting function must be provided to an air conditioner system of this type in order to defrost the surface of an outdoor heat exchanger serving as an evaporator during heating operation, thereby preventing degradation of the heating capacity.

Preferably, the first and second items are systematically improved to enhance comfort of the user.

However, no conventional air conditioner system of this type satisfies the second item in association with the first item while the first item is satisfied.

SUMMARY OF THE INVENTION

It is, therefore, an object of the present invention to provide a new and improved air conditioner apparatus which improves the initial operation of the heating capacity to greatly contribute to comfort of the user, prevents an increase in current at the start of operation of a compressor and hence an increase in peak power, and has a simple arrangement.

It is another object of the present invention to provide an air conditioner apparatus having an effective defrosting function in addition to the above-mentioned feature.

It is still another object of the present invention to provide a method of controlling an air conditioner apparatus to allow effective functioning of the heating operation assist capacity.

According to one aspect of the present invention, there is provided an air conditioner apparatus comprising:

temperature setting means for setting a desired temperature;

indoor temperature detecting means for detecting an indoor temperature;

timer means for setting an operation start time;

an indoor unit including at least an indoor heat exchanger, an air duct associated with the indoor heat exchanger, a heat radiation member located in the air duct, a heat accumulator thermally coupled to the heat radiation member, and an electric heater for selectively supplying heat to the heat accumulator;

an outdoor unit including at least a compressor for cooperating with the indoor heat exchanger to constitute a heat pump refrigeration cycle for heating operation, and an outdoor heat exchanger; and control means for outputting a first control signal for preheating the electric heater a predetermined period of time before operation start time by counting preset data of the operation start time from the timer means, a second control signal for setting the heat pump refrigeration cycle in a drive state at the operation start time, and for controlling a drive state on the basis of desired temperature data set by the temperature setting means and indoor temperature data detected by the indoor temperature detecting means, thereby maintaining an indoor temperature at the desired temperature.

BRIEF DESCRIPTION OF THE DRAWINGS

These and other objects and features of the present invention can be understood through the following embodiment by reference to the accompanying drawings, in which.

DETAILED DESCRIPTION OF THE PREFERRED EMBODIMENT

Figure 1:
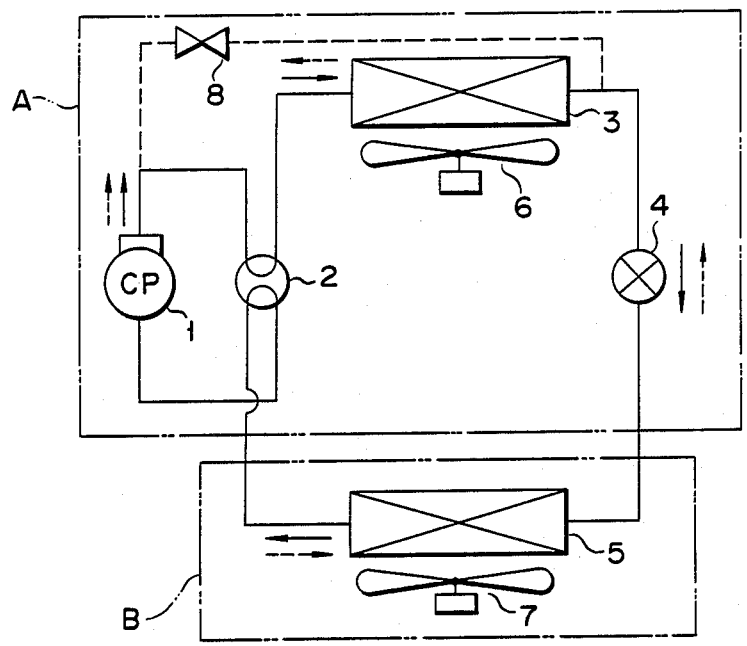
FIG. 1 is a schematic diagram of a refrigeration cycle in an air conditioner apparatus to which the present invention is applied.

A preferred embodiment of the present invention will be described with reference to the accompanying drawings. The same reference numerals throughout the drawings denote the same parts, and a detailed description thereof will not be repeated.

A heat pump type air conditioner apparatus employing the present invention is generally described with reference to FIG. 1.

Referring to FIG. 1, reference number 1 denotes a compressor. Compressor 1 is connected to 4-way valve 2, outdoor heat exchanger 3, an expansion device (e.g., expansion valve 4, capillary tube), and indoor heat exchanger 5 to constitute a heat pump type refrigeration cycle. Outdoor fan 6 is arranged near outdoor heat exchanger 3. Outdoor heat exchanger 3, outdoor fan 6, compressor 1, 4-way valve 2, and expansion valve 4 constitute outdoor unit A. Indoor fan 7 is arranged near indoor heat exchanger 5. At least indoor heat exchanger 5 and indoor fan 7 constitute indoor unit B.

During the cooling operation, a refrigerant is supplied in a direction indicated by a solid line to form a cooling cycle. Outdoor heat exchanger 3 serves as a condenser, and indoor heat exchanger 5 serves as an evaporator. However, during the heating operation, 4-way valve 2 is switched to cause the refrigerant to flow in a direction of a broken arrow to form a heating cycle. In this case, indoor heat exchanger 5 serves as a condenser, and outdoor heat exchanger 3 serves as an evaporator.

Figure 2:
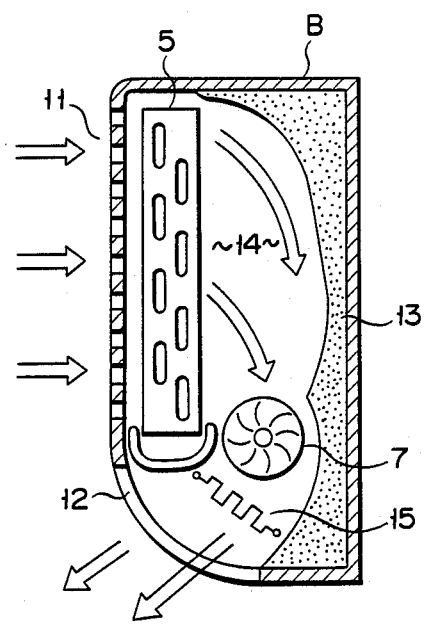
FIG. 2 is a schematic sectional view showing an internal structure of an indoor unit with an electric heater in the air conditioner apparatus shown in FIG. 1.

In order to improve the initial operation of the heating capacity in the heat pump type air conditioner apparatus, an electric heater is arranged, as shown in FIG. 2.

Referring to FIG. 2, air intake port 11 is formed in front of the housing of indoor unit B, and air delivery port 12 is formed in the lower portion of the housing. In the housing, air duct 14 is formed by heat insulating material 13 from air intake port 11 to air delivery port 12. Indoor heat exchanger 5 is arranged near air intake port 11 in air duct 14. Indoor fan 7 and electric heater 15 for auxiliary heating are sequentially arranged in air duct 14 between indoor heat exchanger 5 and air delivery port 12 in the order named.

During the heating operation, indoor air received through air intake port 11 receives heat from indoor heat exchanger 5 serving as a condenser and heat from electric heater 15, and the temperature of air can be increased. Hot air is then delivered from air delivery port 12 into a room. If the air conditioner apparatus is set in a drying operation (dehumidifying operation) mode, electric heater 15 also serves as a reheater.

In order to achieve a high heating capacity by simply arranging an electric heater, the capacity of the electric heater must be increased. Therefore, an additional current having an intensity corresponding to a capacity (e.g., 1,800 W) of an electric heater flows at the start of operation of the compressor. When the air conditioner is used in home, an actual current may undesirably exceed the allowable current. In addition, when the air conditioner systems are simultaneously used in different homes, a peak power supplied from a power plant is increased. The electric heater is temporarily overheated, and its peripheral structure and heat support component must be heat-resistive. The overall arrangement is undesirably complicated.

The structure of the main part of indoor unit B employed in the present invention will be described below.

Figure 3:
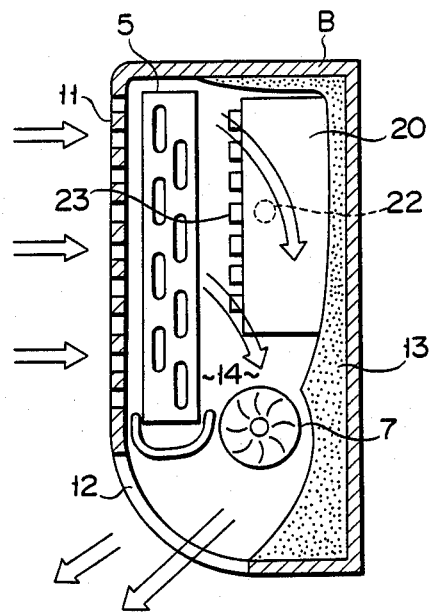
FIG. 3 is a schematic sectional view showing an internal structure of an indoor unit according to an embodiment of the present invention.
Figure 4:
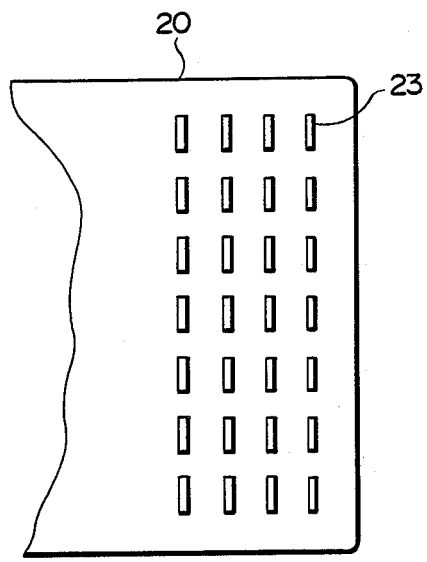
FIG. 4 is a front view of a heat accumulator in the apparatus shown in FIG. 3.
Figure 5:
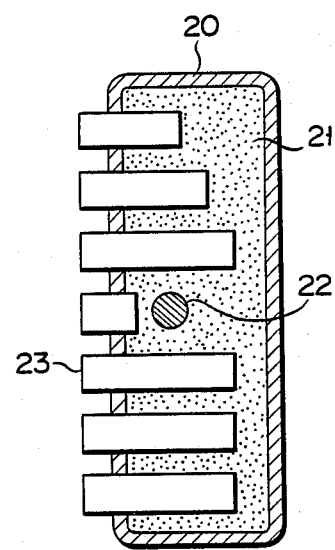
FIG. 5 is a schematic sectional view showing the internal structure of the accumulator.

As shown in FIGS. 3, 4, and 5, in air duct 14 of indoor unit B, heat accumulator 20 is arranged on heat-insulation material 13 between indoor heat exchanger 5 and indoor fan 7. Heat accumulator 20 accumulates heat by melting a heat-accumulating material (e.g., paraffin 21) filled therein. Electric heater 22 is arranged inside accumulator 20 to heat paraffin 21. A large number of heat radiation fins 23 extend from the inner portion of heat accumulator 20 toward indoor heat exchanger 5. Examples of material for heat accumulator 20 are water and a hydrate compound, as alternatives to paraffin. However, since paraffin has a melting point of 46° C., its phase transformation can be effectively utilized. In addition, paraffin has anticorrosion and antioxidation properties and is chemically stable. Therefore, paraffin is very effective in the present invention.

Figure 6:
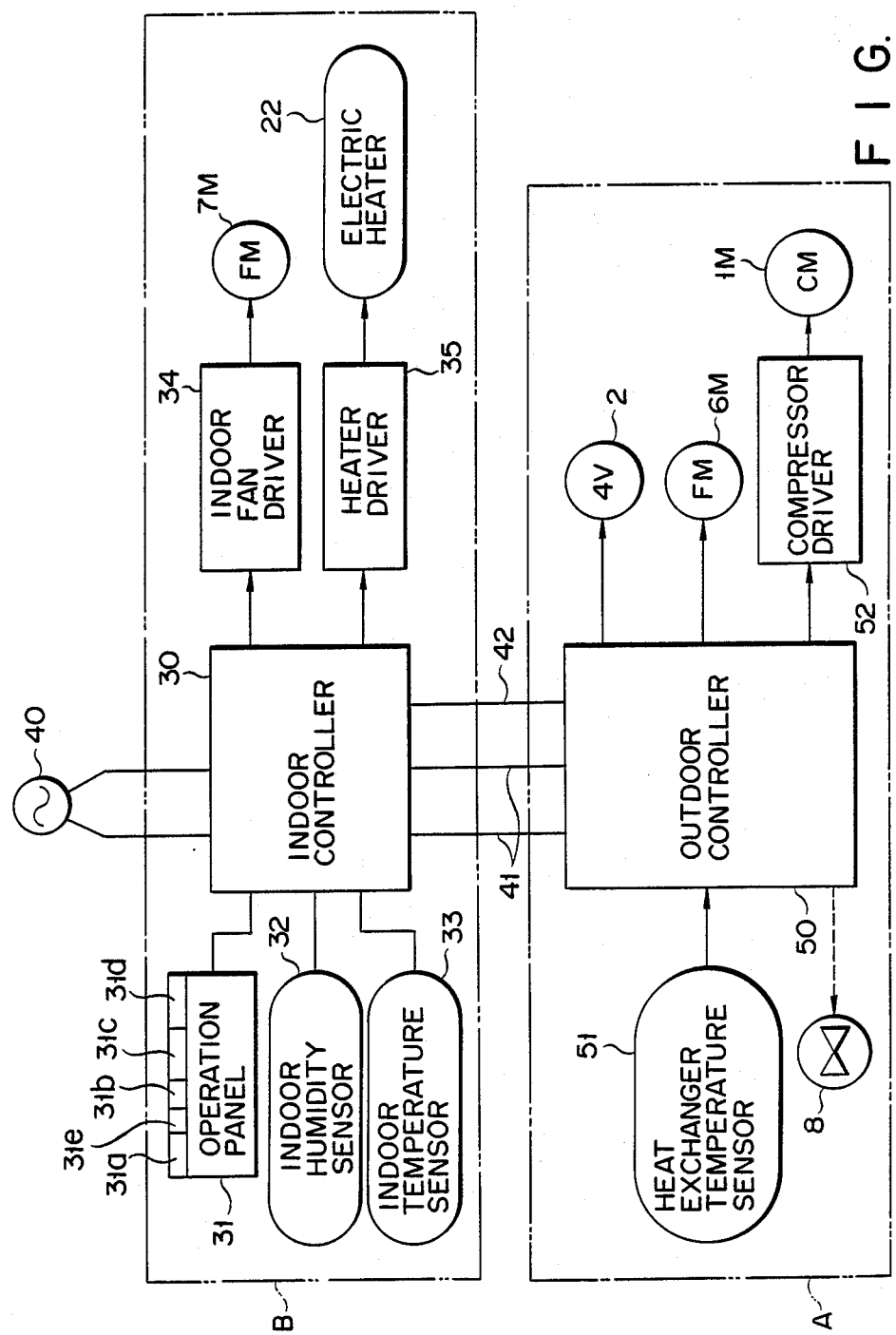
FIG. 6 is a block diagram of a control circuit in the apparatus shown in FIG. 3.

FIG. 6 shows a control circuit of the air conditioner apparatus.

Indoor controller 30 uses commercial AC power source 40 as an operating power source. Indoor controller 30 is connected to operation panel 31, indoor temperature sensor 33, indoor humidity sensor 32, indoor fan driver 34, and heater driver 35. Indoor controller 30 comprises a microcomputer and its peripheral circuits. Operation panel 31 includes at least mode selector 31a for selecting a heating or cooling operation mode, timer 31b for setting operation start time, temperature preset member 31c for presetting a desired temperature, humidity preset member 31d for presetting a desired humidity, and drying (dehumidifying) operation mode set member 31e. By using these elements of the operation panel, a user can input various operation conditions. Indoor temperature sensor 32 detects a temperature of indoor air taken from air intake port 11. Indoor humidity sensor 33 detects a humidity of indoor air taken from air intake port 11. Indoor fan driver 34 drives indoor fan motor 7M at a speed represented by a command from indoor controller 30. Heater driver 35 applies a voltage represented by the command from indoor controller 30 to electric heater 22.

In outdoor unit A, reference number 50 denotes an outdoor controller. Controller 50 receives an operating voltage from indoor controller 30 through power source line 41. Outdoor controller 50 is connected to heat exchanger temperature sensor 51, compressor driver 52, 4-way valve 2, and outdoor fan motor 6M. Outdoor controller 50 comprises a microcomputer and its peripheral circuits. Outdoor controller 50 exchanges data with indoor controller 30 through serial signal line 42. Compressor driver 52 drives compressor motor 1M in response to a command from outdoor controller 50.

Figure 7:
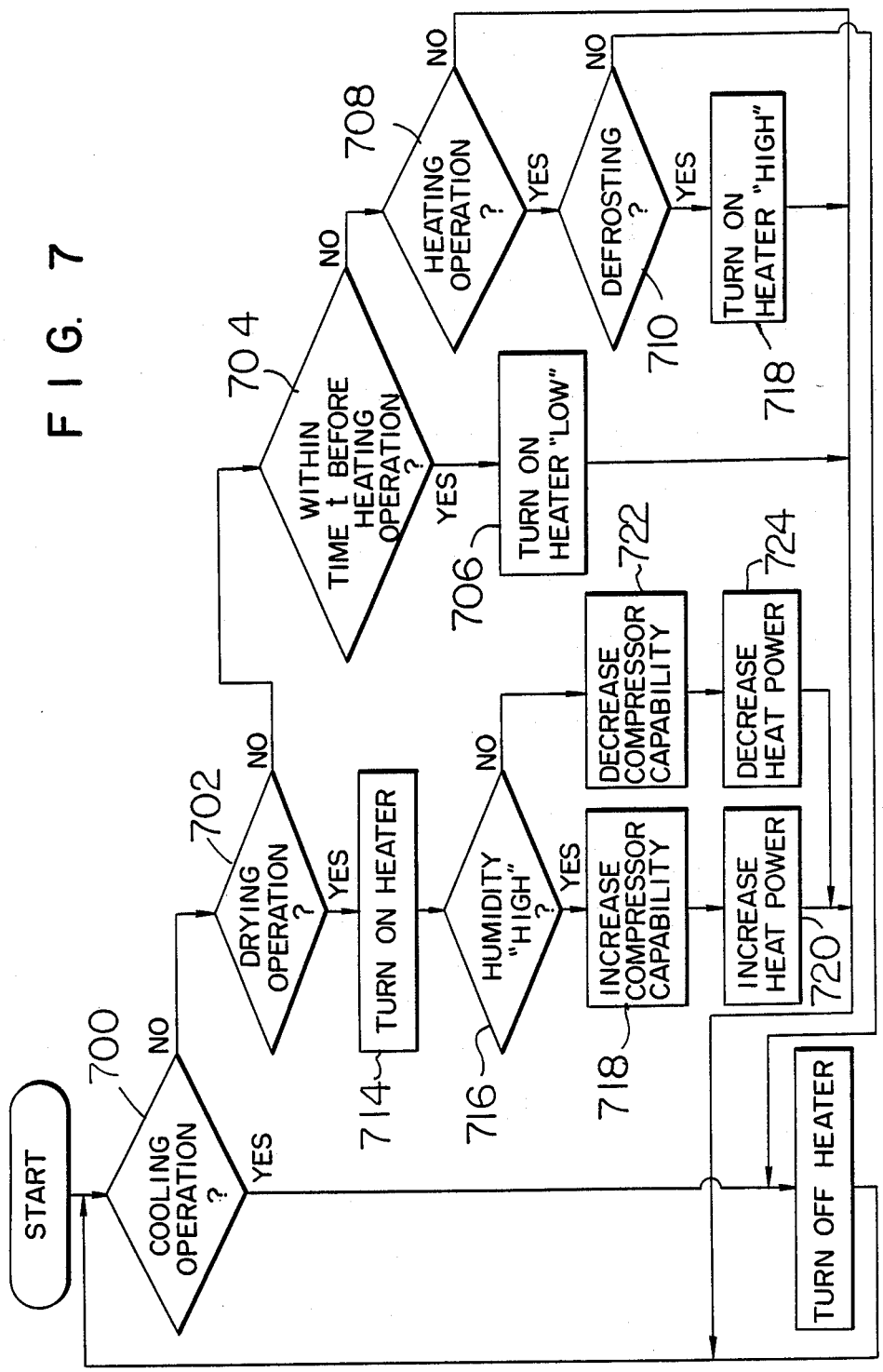
FIG. 7 is a flow chart for explaining the operation of the apparatus shown in FIG. 3.

The operation of the air conditioner apparatus having the arrangement described above will be described with reference to a flow chart of FIG. 7.

A cooling operation is checked at step 700, and drying operation checked at step 702. If both results are negative, a heating operation is commanded. The user operates mode selector 31a, timer 31b, temperature preset member 31c, and humidity preset member 31d in operation panel 31 in order to set a heating operation mode, an operation start time, a desired temperature, and a desired humidity, respectively. Upon completion of the initial setting, the counter in indoor controller 30 is started. Thereafter, when a time which is a time t (for example, tl: 6 hour, room temperature≦5° C., t2: 4 hour, room temperature >5° C. ). before the operation start time has reached, step 704 becomes positive and indoor controller 30 begins its control operation to supply a low voltage to electric heater 22 at step 706 so as to cause heater 22 to perform a low-output heating operation (30 to 50 W). When electric heater 22 is operated, the paraffin in heat accumulator 20 is gradually melted to accumulate heat (e.g., to about 70° C. )

When the operation start time is reached compressor 1, outdoor fan 6 and indoor fan 7 are started. At the same time, 4-way valve 2 is switched to start the heating operation. Upon starting of the heating operation, electric heater 22 is stopped.

During the heating operation, indoor air is taken from air intake port 11 by indoor fan 7 and receives heat from indoor heat exchanger 5 serving as a condenser. Air further receives heat from fins 23 of heat accumulator 20, and the temperature of air is further increased. Hot air is then delivered from air delivery port 12. In other words, heat accumulated by heat accumulator 20 is utilized as the initial auxiliary heat, and the heating capacity of the initial heating period is improved. As a result, a room can be quickly heated. By the time the heat accumulated by heat accumulator 20 is exhausted, the refrigeration cycle can be stabilized, and a sufficient heating capacity can be obtained by only using heat supplied from outdoor heat exchanger 3. In such a stable state in the refrigeration cycle, data from indoor temperature sensor 33 is compared by indoor controller 30 with the data preset by temperature preset member 31c. Compressor driver 52 is then controlled through outdoor controller 50 so as to set a difference between the detected and preset values to approach zero.

During the heating operation, step 708 gives a "yes" result, and a detected temperature (i.e., a temperature of outdoor heat exchanger 3) from heat exchanger temperature sensor 51 is periodically obtained. When the detected temperature is less than a reference temperature, defrosting is detected at step 710 and 4-way valve 2 is operated to stop the operation of outdoor fan 6. At the same time, a high voltage is applied to electric heater 22, at step 712 and electric heater 22 is to operate the heater to produce a high output (200 to 400 W). When 4-way valve 2 is energized, a defrosting (cooling) cycle is formed, and a high-temperature refrigerant is supplied to outdoor heat exchanger 3.

As the heating operation progresses, the surface of outdoor heat exchanger 3 serving as an evaporator is frosted. If outdoor heat exchanger 3 is kept frosted, the heating capacity is degraded. In order to prevent this, outdoor heat exchanger 3 is periodically defrosted, as described above, as needed. During the defrosting operation, since outdoor fan 6 is stopped, defrosting efficiency can be improved. The temperature of air taken from air intake port 11 by indoor fan 7 is increased by heat from electric heater 22 operated to generate a high output. Hot air is then delivered from air delivery port 12. In other words, the heating operation continues during defrosting. The electric heater need not be set in the high-output operating state during defrosting. A high-temperature refrigerant may be supplied from the compressor to the outdoor heat exchanger to perform defrosting.

In the air conditioner system according to the present invention, the temperature of heat accumulator 20 at the start of operation of the system is about 70° C. When about 10 minutes have elapsed, the temperature of indoor heat exchanger 5 reaches 47° to 53° C., and the temperature of heat accumulator 20 is about 45° to 50° C. accordingly. Heat is accumulated by heat accumulator 20 to some extent, and the electric heater need not be operated during defrosting. In order to further improve comfort in the room during defrosting, the electric heater is operated in the high-output operating state, as described above. In order to supply the high-temperature refrigerant from compressor 1 to outdoor heat exchanger 3 to perform defrosting, (i) the 4-way valve is reversed to perform cooling operation or (ii) a bypass circuit is arranged between a delivery pipe of compressor 1 and a heating-mode inlet side of outdoor heat exchanger 3, as shown in FIGS. 1 and 6 (a broken line in FIG. 1) and (ii), 4-way valve 2 is held in the heating mode and valve 8 is open during defrosting.

Before and during the cooling operation, electric heater 22 is kept off. Air which is cooled by indoor heat exchanger 5 serving as an evaporator is delivered from air delivery port 12 into a room.

However, during drying (dehumidifying) operation performed by setting mode set member 31e in the cooling operation and detected at step 702, electric heater 22 is operated by a command at step 714, and air which is cooled and dehumidified by indoor heat exchanger 5 is heated again. In other words, air at room temperature can be delivered from air delivery port 12 into the room. During drying operation, the humidity of the room is detected by indoor humidity sensor 33. If a detected humidity is detected to higher than a preset value or a reference value at step 716, the capacity of compressor 1 is increased at step 718. At the same time, a voltage applied to electric heater 22 is increased at step 720. Therefore, heat from electric heat 22 can be increased, thereby improving the dehumidifying capacity. However, if the detected humidity is lower than the preset or reference value at step 716, the capacity of compressor 1 is decreased at step 722. At the same time, a voltage applied to electric heater 22 is decreased at step 724, and heat from heater 22 is decreased accordingly. As a result, the dehumidifying capacity is decreased. An increase or decrease in voltage applied to heater 22 is controlled by a thyristor in heater driver 35. An increase or decrease in capacity of compressor 1 is performed by the ON/OFF operation or rpm control in compressor driver 52.

Electric heater 22 is operated to accumulate heat before the heating operation. The accumulated heat is utilized as auxiliary heat during the heating operation. Therefore, the capacity of the initial heating period can be improved, thereby improving comfort of the user. In particular, since heat from heater 22 is gradually accumulated, heater 22 may have a small capacity, and therefore, an increase in cost can be prevented. In addition, power consumption can be reduced to result in an economical advantage.

Operation time t of electric heater 22 before heating operation is set in consideration of a shortage of the heating capacity given by heat from outdoor heat exchanger 3. Therefore, auxiliary heating can be assured. In addition, by setting the operating time t, wasteful heat, i.e., wasteful consumption of power can be prevented. Furthermore, heat radiation fins 23 are provided to improve heat radiation efficiency of heat accumulator 20.

In the above embodiment, operating time t of electric heater 22 may be automatically changed in accordance with a detected indoor or outdoor temperature.

The present invention is not limited to the particular embodiment described above. Various changes and modifications may be made within the spirit and scope of the invention.

According to the present invention, the air conditioner system having a heating capacity assist function comprises a heat accumulator arranged in an air duct in an indoor unit, a heater mounted in the heat accumulator and a means for operating the heater prior to the heating operation. Therefore, the capacity of the initial heating period can be improved. Also, the air conditioner system prevents an increase in current at the start of operation of a compressor and hence an increase in peak power, and has a simple arrangement. At the same time, comfort can be greatly improved.

What is claimed is:

1. An air conditioner apparatus comprising:
temperature setting means for setting a desired temperature;
indoor temperature detecting means for detecting an indoor temperature;
timer means for setting an operation start time;
an indoor unit including at least an indoor heat exchanger, an air duct connected to said indoor heat exchanger, a heat radiation member located in said air duct to radiate heat therewithin, a heat accumulator thermally coupled to said heat radiation member, and an electric heater, coupled to said heat accumulator, for selectively supplying heat to said heat accumulator;

an outdoor unit including at least a compressor, coupled to said indoor heat exchanger, and an outdoor heat exchanger; and control means for determining a predetermined period of time of preheating of said heater, for outputting a first control signal for preheating said electric heater said predetermined period of time before said operation start time by counting preset data of the operation start time from said timer means, a second control signal for setting a heat pump refrigeration cycle, formed by said indoor and outdoor units, in a drive state at the operation start time, and for controlling the drive state on the basis of desired temperature data set by said temperature setting means and indoor temperature data detected by said indoor temperature detecting means, thereby maintaining an indoor temperature at the desired temperature.

2. An apparatus according to claim 1, wherein said heat accumulator stores paraffin which is then melted by heat from said electric heater.

3. An apparatus according to claim 1, wherein said electric heater is preheated at a relatively low output of 30 to 50 watts.

4. An apparatus according to claim 2, wherein heat accumulated by said heat accumulator has a temperature of about 70° C.

5. An apparatus according to claim 1, wherein preheating of said electric heater is interrupted at the operation start time.

6. An air conditioner apparatus comprising:

temperature setting means for setting a desired temperature;

indoor temperature detecting means for detecting an indoor temperature;

timer means for setting an operation start time for at least a heating operation;

an indoor unit including at least an indoor heat exchanger, an air duct coupled to said indoor heat exchanger, a heat radiation member located in said air duct to radiate heat therewithin, a heat accumulator thermally coupled to said heat radiation member, and an electric heater, coupled to said heat accumulator, for selectively supplying heat to said heat accumulator;

an outdoor unit including compressor means, coupled to said indoor heat exchanger, for forming a heat pump refrigeration cycle therewith for heating and cooling operations, and including an outdoor heat exchanger;

first control means for outputting a first control signal for preheating, in a low output state, said electric heater a predetermined period of time before a heating operation start time by counting preset data of the heating operation start time from said timer means, a second control signal for setting the heat pump refrigeration cycle in a drive state for the heating operation at the heating operation start time, and for controlling the drive state for the heating operation on the basis of desired temperature data set by said temperature setting means and indoor temperature data detected by said indoor temperature detecting means, thereby maintaining an indoor temperature at the desired temperature;

heat exchanger temperature detecting means for detecting a temperature of said outdoor heat exchanger; and second control means for controlling said heat pump refrigeration cycle to conduct a high-temperature refrigerant from said compressor to said outdoor heat exchanger, when detection data from said heat exchanger temperature detecting means in the drive state for the heating operation is smaller than a reference value, thereby initiating a defrosting operation for defrosting said outdoor heat exchanger.

7. An apparatus according to claim 6, wherein said second control means outputs a control signal to set said electric heater in a high output state, and the heat pump refrigeration cycle in a drive state for the cooling operation, when detection data from said heat exchanger temperature detecting means in the drive state for the heating operation is smaller than a reference value, thereby initiating a defrosting operation for defrosting said outdoor heat exchanger.

8. An apparatus according to claim 7, wherein the low output state is defined by about 30 to 50 W, and the high output state is defined by about 200 to 400 W.

9. An apparatus according to claim 6, wherein said outdoor unit comprises an outdoor fan which is stopped when the defrosting operation is performed by said second control means.

10. An apparatus according to claim 6, wherein said indoor unit comprises an indoor fan which is driven during the defrosting operation by said second control means.

11. A method for controlling an air conditioner, comprising the steps of:

determining an operation start time of the air conditioner;

determining a preheating time for an electric heater for selectively supplying heat to a heat accumulator arranged in an air duct in an indoor unit;

preheating the electric heater a predetermined time before the operation start time;

driving a heat pump type refrigeration cycle constituted by said indoor unit and an outdoor unit when the operation start time for the heating operation is reached; and controlling a drive state of the heat pump refrigeration cycle for the heating operation on the basis of temperature preset data and indoor temperature detection data.

* * * * *